US008098183B1

(12) United States Patent
Pedersen

(10) Patent No.: US 8,098,183 B1
(45) Date of Patent: Jan. 17, 2012

(54) PRIORITY DELIVERY APPARATUS AND METHOD

(75) Inventor: Richard N. Pedersen, Toms River, NJ (US)

(73) Assignee: Lockheed Martin Corporation, Bethesda, MD (US)

(*) Notice: Subject to any disclaimer, the term of this patent is extended or adjusted under 35 U.S.C. 154(b) by 456 days.

(21) Appl. No.: 12/403,733

(22) Filed: Mar. 13, 2009

(51) Int. Cl.
*G01S 7/36* (2006.01)
(52) U.S. Cl. ............................. 342/13; 342/90
(58) Field of Classification Search .................... 342/13, 342/90
See application file for complete search history.

(56) References Cited

U.S. PATENT DOCUMENTS

| | | | |
|---|---|---|---|
| 4,593,286 A * | 6/1986 | Mathews et al. | 342/88 |
| 5,583,792 A | 12/1996 | Li et al. | |
| 6,260,759 B1 * | 7/2001 | Nguyen et al. | 235/411 |
| 6,338,011 B1 | 1/2002 | Furst et al. | |
| 6,600,737 B1 | 7/2003 | Lai et al. | |
| 7,016,302 B1 | 3/2006 | Schramm et al. | |
| 7,020,701 B1 * | 3/2006 | Gelvin et al. | 709/224 |
| 7,061,860 B1 | 6/2006 | Calvignac et al. | |
| 7,136,360 B2 | 11/2006 | Voce et al. | |
| 7,136,602 B2 | 11/2006 | Umezawa | |
| 7,167,452 B2 | 1/2007 | Jameson et al. | |
| 2003/0218979 A1 | 11/2003 | Storry et al. | |
| 2005/0248480 A1 | 11/2005 | Butler et al. | |
| 2007/0002740 A1 | 1/2007 | Evans et al. | |
| 2007/0115848 A1 | 5/2007 | Chean et al. | |
| 2008/0018545 A1 | 1/2008 | Kaplan et al. | |

OTHER PUBLICATIONS

In the name of Bergman, David R., U.S. Appl. No. 12/199,082, filed Aug. 27, 2009 entitled "Method for Transmission of Target Information Over A Network".

In the name of Le et al, U.S. Appl. No. 12/107,428, filed Apr. 22, 2008 entitled "Adaptive Network Data Shaper".
Van Jacobson (1995), "Congestion avoidance and control". In proceeding of ACM SIGCOMM, pp. 314-329, New York, NY: ACM press.
Q. K. Shao and H. G. Zhang (2002), "TCP performance over satellite link".
B. Y. Choi, (2002), "Adaptive random sampling for load change detection".
S. Ma and C. Ji (2001), "Modeling heterogeneous network traffic in wavelet domain". IEEE/ACM transactions on networking, 9(5).
M. Mandjes, I. Saniee, S. Stolyar and R. Schmidt (2000), "Load characterization, overload prediction and load anomaly prediction for VoIP". In proceeding of Allerton Conference.
P. Flandrin (1992), "Wavelet analysis and synthesis of fractional Brownian motion". Information Theory, IEEE Transaction, 38(2).
T. Hastie, R. Tibshirani, J. Friedmaa (2001), "The Elements of Statistical Learning". NY, NY:Springer Verlag. pp. 64, 66, 84, 95, 96, 482, 532, 536, 540, 551, 558, 559, 560, 569, 581, 659, 660, 671, 695, 745.
V. Moskivina, et al, (2001), "Application of the singular spectrum analysis for change-point detection in time series" (doctoral thesis).
Last Notice of Allowance dated Sep. 10, 2010 issued in co-pending U.S. Appl. No. 12/199,082, filed Aug. 27, 2008 of David R. Bergman.
Office Action dated Aug. 17, 2010 issued in co-pending U.S. Appl. No. 12/107,428, filed Apr. 22, 2008 of Tuong Le.

* cited by examiner

*Primary Examiner* — Timothy A Brainard

(74) *Attorney, Agent, or Firm* — Howard IP Law Group, PC

(57) ABSTRACT

A method conveys information over a network to client processors, each with a maximum analysis rate. Sensed signals include target track updates generated at an aggregate track update rate depending on the number of targets and sensors. The track updates are prioritized. The prioritized updates are analyzed, for each client, in view a channel-priority representing the time rate of updates previously sent to the client. The selected higher-priority updates are destined for the client at an average rate no greater than the maximum analysis rate of the client. The lower-priority track updates not destined for the client are deleted. The selected updates are transmitted to their client processors.

20 Claims, 7 Drawing Sheets

| | | |
|---|---|---|
| 501. | FOR EACH TRACK UPDATE U, DO | |
| 502. | $t_A \leftarrow t_A - t_C + t_U$ | // REDUCE $t_A$ BY THE TIME SINCE LAST UPDATE |
| 503. | IF $t_A < 0$, THEN $t_A \leftarrow 0$ | // $t_A$ CANNOT TAKE ON NEGATIVE VALUES |
| 504. | $P_U \leftarrow$ PRIORITY OF UPDATE | // DETERMINE THE PRIORITY OF UPDATE |
| 505. | IF $P_U$ = CRITICAL | // IS THIS A CRITICAL PRIORITY UPDATE? |
| 506. | THEN | |
| 507. | SEND DATA TO CLIENT | // ALWAYS SEND CRITICAL UPDATES TO CLIENT. |
| 508. | $t_A \leftarrow t_A + \Delta t$ | // INCREASE $t_A$ BY DELTA_$t$ |
| 509. | $t_L \leftarrow t_C$ | // UPDATE TIME $t_L$ THAT LAST DATA WAS SENT TO CLIENT. |
| 510. | ELSE | // UPDATE NOT CRITICAL. |
| 511. | $P_C = (t_A - t_C + t_L) / \Delta t$ | // CALCULATE THE CHANNEL PRIORITY |

*FIG. 5A*

```
512.     IF P_U ≥ P_C                    // TRUE IF TRACK UPDATE PRIORITY IS ≥ THE DATA CHANNEL PRIORITY
513.     THEN                            // SYSTEM SENDS THE DATA
514.         SEND DATA TO CLIENT
515.         t_A ← t_A + Δt              // INCREASE t_A BY DELTA_t
516.         t_L ← t_C                   // UPDATE TIME t_L THAT LAST DATA WAS SENT TO CLIENT.
517.     ELSE                            // SYSTEM DOESN'T SEND RELATIVELY LOW-PRIORITY UPDATES TO CLIENT.
518.         DROP UPDATE U
519.     END-IF
520. END-IF
521. t_U ← t_C                           // UPDATE THE TIME t_U OF LAST DATA UPDATE WAS PROCESSED.
522. END-FOR
```

600. FOR EACH TRACK UPDATE INSERTED INTO THE DATA QUEUE

601. INCREMENT X    // X IS USED TO INDICATE THE NUMBER OF OBJECTS IN THE QUEUE

602. IF $x \geq n - m$ THEN

603. REMOVE THE OLDEST TRACK UPDATE FROM THE QUEUE AND DECREMENT X

604. RETURN TO STEP 602

605. END-IF

606. END-FOR

*FIG. 6*

PRIORITY DELIVERY APPARATUS AND METHOD

GOVERNMENT RIGHTS

This invention was made with Government Support under Contract No. N00024-05-C-5346 awarded by the Department of the Navy. The Government has certain rights in this invention.

BACKGROUND OF THE INVENTION

FIG. 1 is a view of a portion 10 of a sea surface 12 in which several platforms in the form of ships are disposed. In FIG. 1, a flotilla 14 of friendly ships includes ships 16, 18, and 20. As described in U.S. patent application Ser. No. 12/199,082, filed on or about Aug. 28, 2008 in the name of Bergman, and entitled METHOD FOR TRANSMISSION OF TARGET INFORMATION OVER A NETWORK (GE-07331), ships 16, 18, and 20 each bear sensors, such as radar, infrared sensors, optical sensors, or the like, designated generally as 21, which sense the presence of the other ships of flotilla 14, and which also sense the presence of other targets in the vicinity, represented by an aircraft 22. Those skilled in the art know that the term "target" merely identifies an object and does not suggest that action is taken against the object. The sensing of aircraft such as 22 by the ships of flotilla 14 is represented in FIG. 1 by "lightning bolt" symbols 24 and 26. The ships 16, 18, and 20 of flotilla 14 communicate among themselves by means of a communication network N, inter-ship portions of which are designated by lightning bolt symbols $N_1$, $N_2$, and $N_3$. Such networks are sometimes known as "tactical" networks. It should be understood that the interplatform or intership network N may include many different signal paths, which variously include digital and analog portions, portions which are encrypted and other portions of which are not encrypted, and which traverse various paths, possibly including a path (not illustrated) extending through a satellite 36.

Each of the sensors of ships 16, 18, and 20 of flotilla 14 makes its own assessment of the sensor signals which its own sensors generate, and digitally distributes the assessed information (or possibly some raw information from some sensors) over an ownship or onboard network (not illustrated in FIG. 1) and also over the network N among the ships of the flotilla 14. Thus, each ship of flotilla 14 nominally has access to all the information from the various ships of the flotilla.

From the location of flotilla 14 of FIG. 1, a hostile ship 30 is over the horizon, and therefore may be invisible to the sensors of the flotilla 14. A friendly ship 32 is illustrated as being in the general vicinity of hostile ship 30, sufficiently so that its sensors can sense the hostile ship, as suggested by lightning bolt 34. Friendly ship 32 also senses aircraft 22 as represented by lightning bolt 38.

The sensors of the various ships of flotilla 14 of FIG. 1 produce data at a prodigious rate. Radar systems, for example, may recurrently scan hundreds of square miles of surface and the volume above it, producing data, possibly at a rate in the hundreds or thousands of megabytes per second. Sonar systems and infrared sensors may also produce large amounts of data. All of these sensors produce data even when there are few targets, and produce the data at even greater rates in a target-rich environment. Even though the inter-ship network N of FIG. 1, including at least paths $N_1$, $N_2$, and $N_2$, has a finite bandwidth and must handle traffic other than sensor data, vast amounts of target data may arrive at each ship from the network. As mentioned, each ship may have its own sensors. Consequently, each ship receives large amounts of information even if only from its own sensors, and this amount of information can only increase when sources external to the ship provide their data.

One conventional way to moderate the information traversing the inter-ship network N is for the operator of the radar or other sensor to "turn off" one or more targets or categories of targets. For example, in the presence of a great deal of sensor data, he may "turn off" the friendly targets, so that data pertaining to targets deemed friendly is or are not transmitted over the network. Another possibility is to turn off transmission of data pertaining to commercial airflights, as not being of immediate interest. Other classes of targets, or specific targets, can be identified for non-transmission over the network. It will be appreciated that it is possible for targets previously deemed to be friendly to later be determined to be hostile, but the blocking of data transmission may inadvertently continue.

The Bergman patent application describes an arrangement for throttling inter-ship transmissions by transmitting data relating to friendly targets or tracks at lower rates than data relating to hostile targets, or in response to proximity of a hostile target to a friendly asset, or by the ability of a recipient to determine position from old data.

Notwithstanding any limitations on the bandwidth of interplatform communications, each platform will continue to receive large amounts of target track and other data. In general, different ships within a flotilla will have different assigned missions, and as a result they will have different target track data needs. For example, ships assigned to counter threats from air objects such as enemy airplanes and/or missiles will have a greater need for data concerning airborne target tracks than ships assigned to minesweeping duties, which ships will be more concerned with surface and sub-surface target tracks. Furthermore, different systems on the same ship are assigned for use in different functions, and such different systems on a single ship will, in general, have needs for different types of target track data. It will be appreciated that some onboard systems may be designed to be able to handle very large information flows. Handling such large information flows may be important to the system function, as for example in the case of overall situation analysis determination, and in the case of hostile boosting or ballistic missile detection, path analysis and engagement with interceptor missiles, guidance of the interceptor missiles toward the hostile missile, and generally enabling ownship to constructively participate in the battle group and perform its assigned tasks. In FIG. 1, the hostile ballistic missile is illustrated as 40, and an interceptor missile is illustrated as 42. There will be other shipboard systems, however, which do not need as much of the sensor data to accomplish their functions. Such other systems may include, for example, undersea warfare systems, which generally do not analyze flying objects.

Improved arrangements for handling data are desired.

SUMMARY OF THE INVENTION

A method according to an aspect of the invention is for transmitting target track updates over a network to a client processor. The method comprises the steps of generating target track updates representative of at least the position of a target. A priority is associated with (or to) each of the target track updates, which associated priority is one of CRITICAL (or its equivalent) or at least one other lesser priority. A target track update queue is provided. The target track update queue includes an input port, and also includes an output port from which output port target track updates can be sent to the client processor. The priority is determined of the current target track update, and, (i) if the priority is determined to be CRITICAL, (a) immediately sending the current target track update to the input port of the queue and (b) incrementing a client processor time workload by a time increment; in one mode of the method, the time increment is the estimated time for the client processor to process the current target track update; (ii) if the priority is less than CRITICAL, (a) determining the channel priority; this may be by summing the client processor time workload with the time that the last update was sent to the client minus the current time to form a sum, and dividing the sum by the time increment, (b) comparing the channel priority with the priority of the current target track update, (c) if the channel priority is greater than the priority of the current target track update, dropping the current target track update, and (d) if the priority of the current target track update is greater than or equal to the channel priority, sending the current target track update to the input port of the queue, adjusting the client processor time workload by adding the time increment, and adjusting the time at which the last update was received by the track server from the track file provider.

A method according to an aspect of the invention is for conveying information over a network (N) to one or more client processors (214), where each of which client processors (214) has a maximum analysis rate, and the maximum analysis rate may vary from client processor (214A, for example) to client processor (214B, for example). The method comprises the step of providing sensed (24, 26) signals (on paths 213) representing at least one target (40). The sensed signals include individual track updates which are generated at an aggregate track update rate that depends at least upon the number of targets and the number of sensors providing the sensed signals. The priority(ies) of individual track updates are set based on predetermined relatively higher and lower priority criteria, to thereby produce relatively higher- and lower-priority track-prioritized individual track updates. For each of the client processors, the track-prioritized individual track updates of the aggregate track updates are analyzed in view of the priority(ies) of the track-prioritized individual track updates and the channel-priority established by the time rate of track updates previously conveyed to the client processor, for selecting those individual higher-priority track updates destined for the client processor (of set 214) at an average rate no greater than the maximum analysis rate of the client processor, and for deleting those individual lower-priority track updates which are not destined for the client processor. The selected ones of said individual higher-priority track updates are, transmitted to the client processor at an average rate no greater than the maximum analysis rate of the client processor. At each client processor, the individual track updates are processed to thereby produce processed track updates. In a particular mode of this method, critical updates are always sent to the client.

In a particular mode of the method, the step of transmitting the individual track updates to the client processor includes the steps of queuing the selected ones of the individual track updates for application to the client processor when the queue is not full, to thereby produce queued individual track updates, and transmitting from the queue to the client processor all of the queued individual track updates. Selected high-priority individual track updates are not queued when the queue is full, thereby effectively discarding those selected high-priority individual track updates which are not queued.

In another particular mode of the method, the step of analyzing the prioritized individual track updates includes the steps of adjusting the measure of the work recently sent to the client by reducing the time that has elapsed since the track update was received from the provider, selecting a priority value for the track update, based on predefined criteria, dividing the reduced measure of the work recently sent to the client by the average processing time needed by the client to process a typical track update, to thereby produce a quotient representing the data channel-priority, predicting current client availability by comparing the calculated data channel priority to the update priority, and if the update priority is greater than or equal to the data channel priority, sending the update to the client.

A system or apparatus according to an aspect of the invention comprises a plurality of ships and a data network extending therebetween. At least some of the ships include sensors for generating target track information including target track updates representing at least the location of a target. The system also includes one or more client processors located aboard at least some of the ships. The client processors have throughput or processing rates which may differ one from the next, as may be required by their functions. A track file provider is located on each of the ships. The track file provider aggregates the track updates generated aboard ownship (if any) with those received over the network. The track file provider also makes the aggregated track updates available on a separate path for each of the client processors. A data queue is associated with each of the separate paths. Each data queue includes a track update output port coupled to a corresponding one of the client processors, and each data queue also includes a track update input port for accepting track updates at the track update input port and for, so long as the data queue does not reach a full condition, eventually transmitting all queued track updates to the associated client processor. The data queue discards the oldest data or track update in the queue if the data queue reaches a full condition. A workload analysis device is coupled in each of the separate paths between the track file provider and the input port of a corresponding data queue, for determining the priority of the current target track update. The workload analysis device associates a priority to each of the target track updates. The associated priority may be CRITICAL (or its equivalent) or at least one other lesser priority. Thus, each track update is prioritized as CRITICAL or a lesser priority. For (i) if the priority is determined by the workload analysis device to be CRITICAL, (a) immediately sending the current target track update to the input port of the queue and (b) incrementing a client processor time workload by a time increment, where the time increment is the estimated time for the associated client processor to process the current target track update, (ii) if the priority is less than CRITICAL, (a) determining the channel priority by summing the client processor time workload with the time that the last update was sent to the client minus the current time to form a sum, and dividing the sum by the time increment, (b) comparing the channel priority with the priority of the current target track update, (c) if the channel priority is greater than the priority of the current target track update, dropping the current target track update, and (d) if the priority of the current target track update is greater than or equal to the channel priority, sending the current target track update to the input port of the queue, adjusting the client processor time workload by adding the time increment, and adjusting the time at which the last update was received by the track server from the track file provider.

BRIEF DESCRIPTION OF THE DRAWING

FIGS. 5A and 5B together are a listing of pseudocode specifying the operation of the track server of FIG. 3; and FIG. 6 is a listing of pseudocode specifying the operation of the operation that prevents the overflow of the data queue of FIG. 3.

DESCRIPTION OF THE INVENTION

Figure 1:
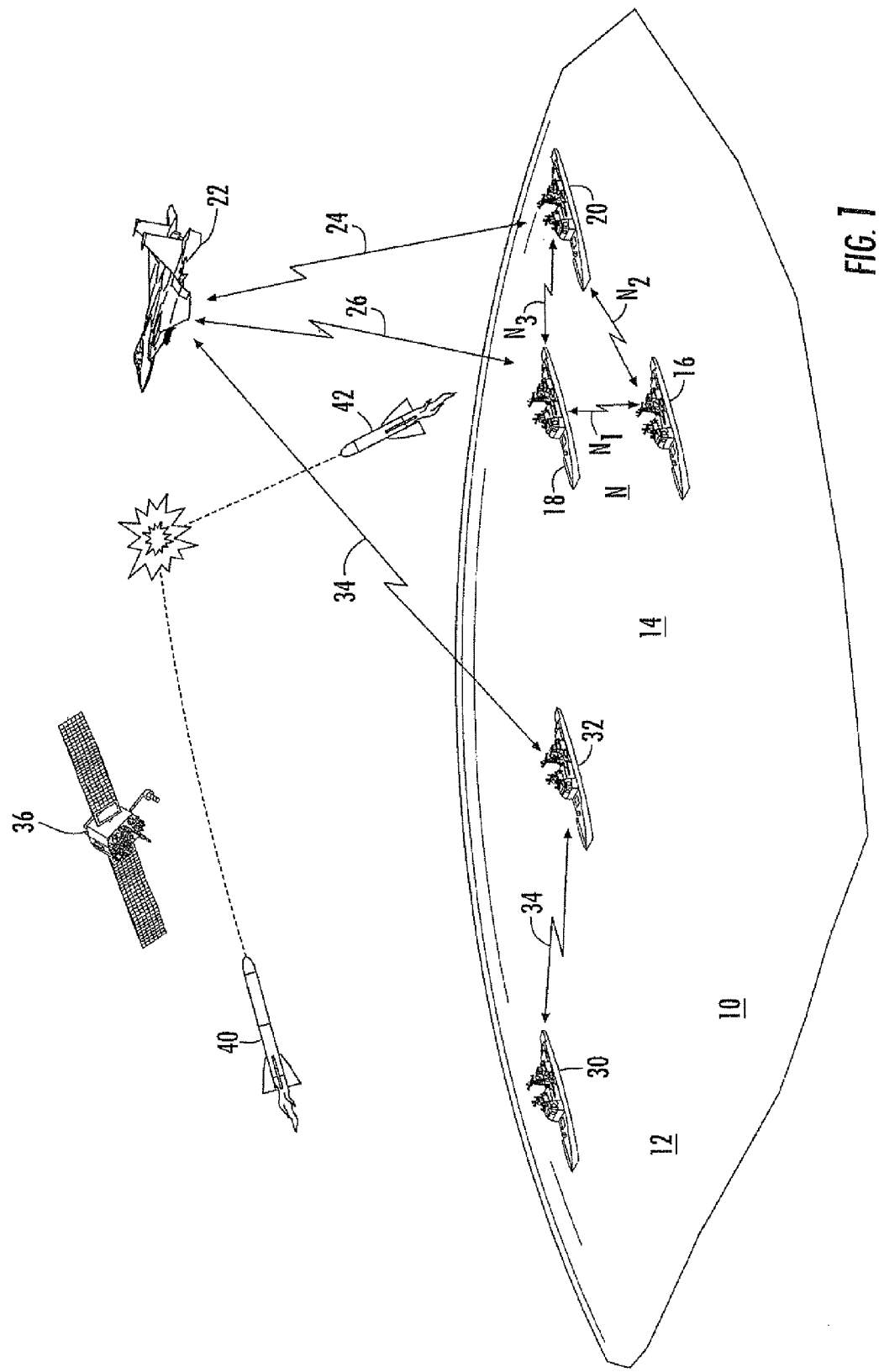
FIG. 1 is a simplified representation of a watery portion of the Earth's surface on which one possible scenario according to an aspect of the invention is played out using a plurality of ships.
Figure 2:
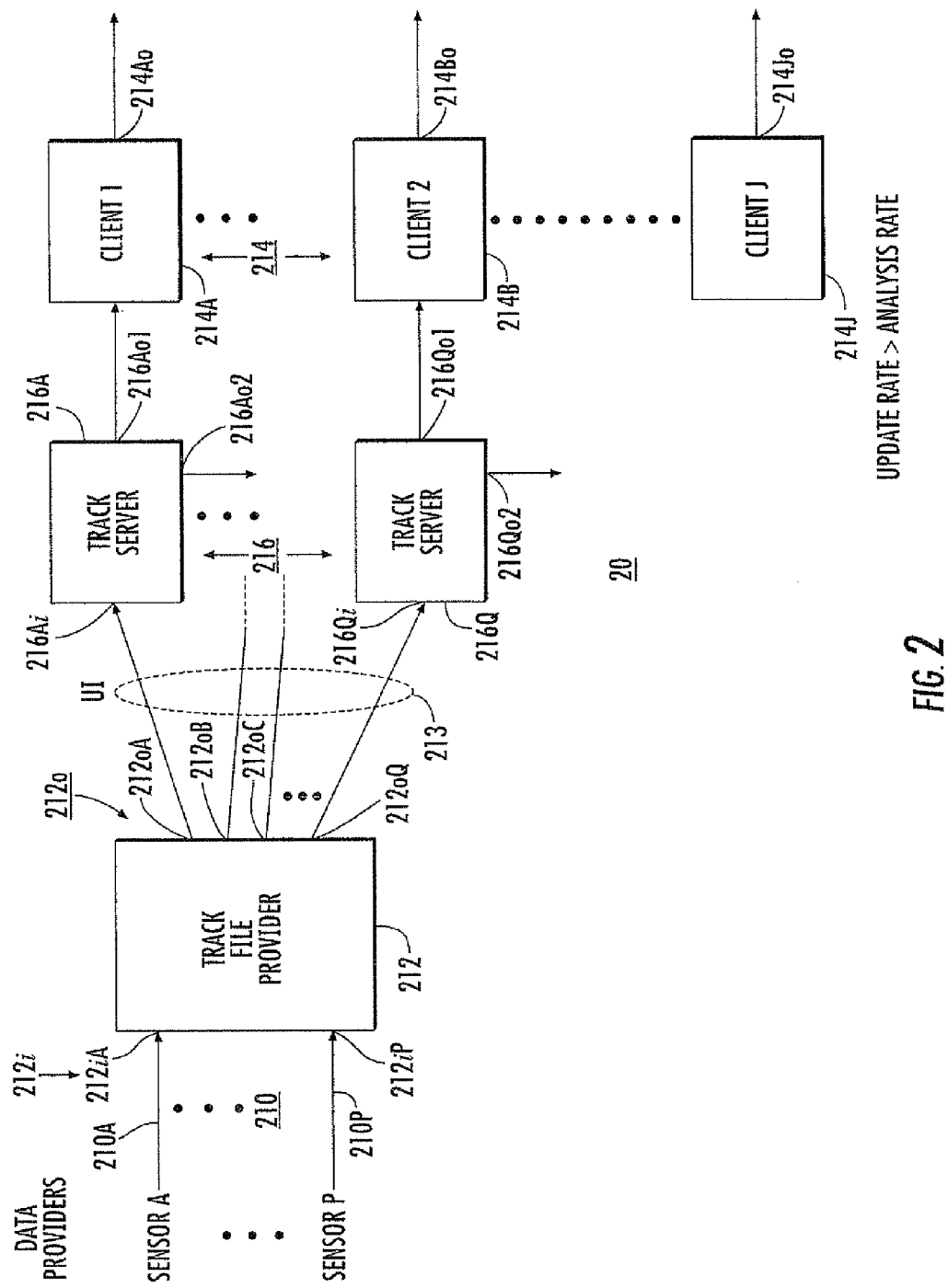
FIG. 2 is a simplified block diagram of equipment and network paths, including track servers, within one of the ships of FIG. 1.

FIG. 2 illustrates equipment aboard one of the ships of FIG. 1, taken as being ship 20. In FIG. 2, a plurality of sensor signal paths, designated together as 210, include a path 210A which carries sensor signals from a sensor A to a track file provider or processor illustrated as a block 212. Similarly, various other paths of set 210 carry other sensor signals, and sensor signal P path 210P carries signals from a sensor P to track file processor 212.

The sensors A through P of FIG. 2 may originate with sensors which are on-board ship 20, or they may originate in whole or in part from other locations than ship 20, and are carried to ship 20 by paths of network N of FIG. 1. In FIG. 2, a plurality of client or consumer processors are illustrated as a set of blocks designated generally as 214. More particularly, set 214 includes a first client processor 214A, a second client processor 214B, and a further client processor 214J. Each of these processors may have a processing rate or processing power different from some or all of the other processors of set 214, as may be appropriate for its specific functions. To be more definite, client processor 214A may evaluate situational awareness or track, identify and engage hostile targets, and for this purpose its output port 214Ao is coupled to any one or many various antimissile weapons such as (a) interceptor missiles and their initiation and guidance software, (b) cannon and other short-range projectile weapons, (c) guided-energy weapons such as lasers. Client processor 214A will be designed to handle very large amounts of data. Client processor 214J may be designed to evaluate and report on the current weather, and for this purpose may not be required to exhibit high-speed behavior, and may be designed with a relatively low data throughput. Client processors intermediate in the set, such as client processor 214B, may have functions and design data throughputs intermediate those of processors 214A and 214J.

In FIG. 2, track file provider 212 combines the various data inputs applied from sensors A through P to its input ports 212I A through 212I P, and generates an aggregate data flow. This aggregate data flow can be expected to sometimes be very large, especially considering that some of the sensor sources are offboard from ownship 20. Thus, when one or more ships join the flotilla 14 of FIG. 1, the number of sensors providing data to track file provider 212 of ship 20 can be expected to increase. This in turn increases the aggregate data flow rate through track file provider 212. The aggregate data flow through track file processor 212 of FIG. 2 is distributed to the output ports of set 212o, including ports 212oA, 212oB, 212oC, ..., and 212oQ. The data flow through each of the output ports of set 212o flows toward one of the clients of set 214 of clients.

Certainly, any of the client processors, as for example the Jth client processor 214J of FIG. 2, may have a throughput or processing rate which is much less than the data generation rate of all the onboard sensors associated with track file provider 212. Also, as mentioned, track file provider 212 of FIG. 2 receives information from a variety of sensors by way of set 210 of data paths, and some of these sources are offboard. Regardless of the throughput of highest-data-rate client processor 214A, the addition of a sufficient number of ships to the flotilla 14 of FIG. 1, and their connection into the network, may result in an aggregate data rate that cannot be handled by at least some of the client processors of set 214.

The invention is intended for use in network applications in which the rate at which data can be delivered to a "consumer" network node can exceed the rate at which the consumer network node (and/or its transmission link) can accept the data. The use of the invention facilitates graceful degradation of network performance, allowing a network to continue to preferentially convey higher priority information rather than lower-priority information as the network approaches saturation.

Track file provider 212 of FIG. 2 receives measurements and other track data from the sensors and communications systems, formats the information for use by the clients, and sends the information toward the clients. No throttling is performed in track file provider 212, and the data rate at the output ports is equal to the cumulative input data rate.

Thus, any one, many, or all of the data output ports of set 212o of output ports may be capable of providing data at a rate greater than can be accommodated by the associated client of set 214 of clients. According to an aspect of the invention, intermediate network nodes, referred to as "analyzer" or "track server" nodes, analyze the data in each path and perform a priority analysis of individual data units (a packet or related group of packets), and also perform a workload analysis. According to another aspect of the invention, each track server node will, in general, analyze and assess the priority of the same data in an independent manner tailored to the specific needs of its client, with the result being that, in general, two different track server nodes may assign different priorities to the same data. The results of the priority and workload analyses are used to determine if or how the data is sent on toward the client. The resulting determination of how to handle the data may result in immediate transmission of the data toward the client, or it may result in temporary storage for later transmission, as for example in a simple first-in, first-out (FIFO) transmission queue. The application of the analysis according to this aspect of the invention avoids the need for multi-queue architectures such as those associated with the Bergman patent application and U.S. patent application Ser. No. 12/107,428, filed on or about Apr. 22, 2008 in the name of Le et al., and entitled ADAPTIVE NETWORK DATA SHAPER. Such architectures may be subject to operational error due to the complexities involved in the priority allocation and implementation. By avoiding the need for multiple priority queues, the need is also avoided to prioritize the data into discrete priority "bins," in that the priority need not be an integer value (1, 2, 3, . . . ) but can instead have a floating-point value (3.14159, for example), if desired.

The priority and workload analysis is implemented in a track server of a set 216 of track servers of FIG. 2. More particularly, the priority and workload for each client of set 214 of clients is analyzed in a track server associated with each data flow. Thus, output port 212oA of track file, provider 212 is coupled to an input port 216Ai of a track server 216A and output 216Ao1 of track server 216A is coupled to first Client 214A, output port 212oQ of track file provider 212 is coupled to an input port 216Qi of track server 216Q, and output port 216Qo1 of track server 216Q is coupled to second Client 214B, and output ports 212oB and 212oC are coupled to the input ports of other track processors (not illustrated) of set 216 of track processors, the outputs of which are coupled to clients of set 214.

Figure 3:
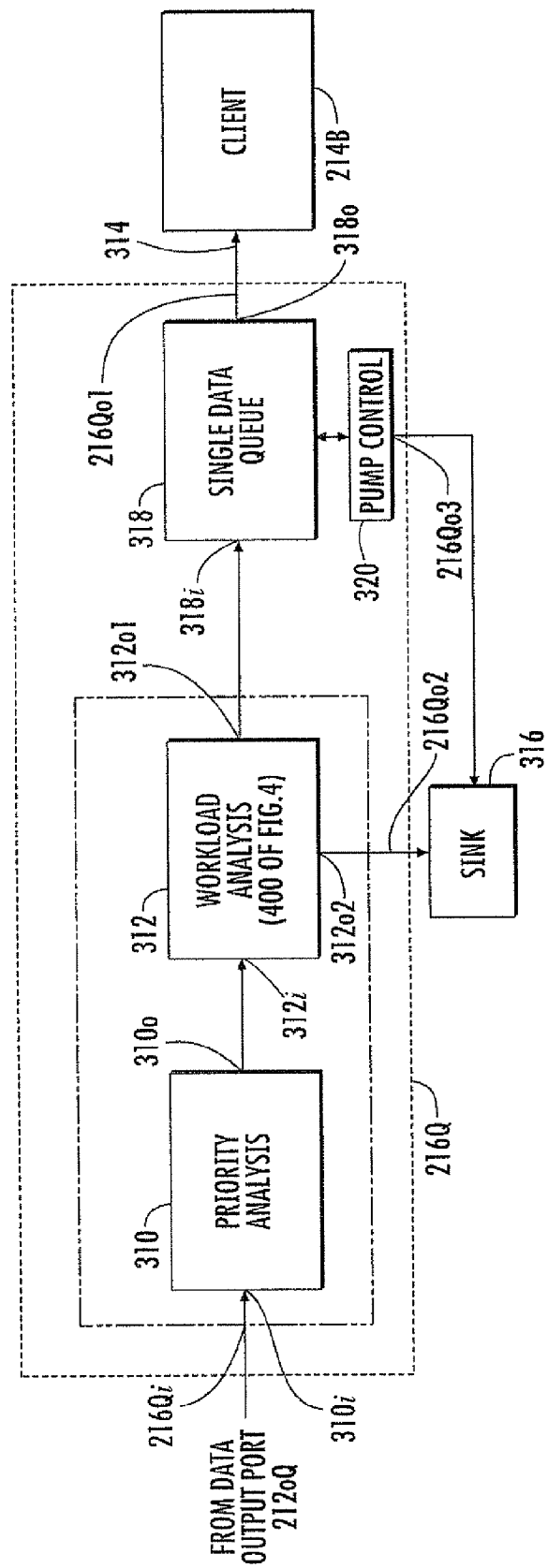
FIG. 3 is a simplified block diagram of a track server of FIG. 2.

FIG. 3 is a simplified block diagram of a representative one of the track servers of set 216 of FIG. 2. For definiteness, the track server illustrated in FIG. 3 is track server 216Q of FIG. 2, and the client is 214B. In FIG. 3, data applied to the input port 216Qi of track server 216Q flows to an input port 310i of a priority analysis arrangement or block 310. Priority analysis block 310 evaluates the data for the purpose of assigning priority to the data from a continuum of possible priorities. A person of ordinary skill in the art will know how to evaluate data for priority determination, so no further description is required. The priority-assigned output of block 310 flows from output port 310o of block 310 to an input port 312i of a workload analysis block 312. Workload analysis block 312 uses an algorithm, further explained below in conjunction with FIGS. 4 and 5, and evaluates the workload imposed upon the client 214B by the previously applied priority-processed data, and allows data to flow by way of its first output port 312o1 to the input port 318i of a single data queue 318. Workload analysis block 312 may also select some of the priority-processed data to be cancelled, deleted or "dumped." The "dumped" data is represented as flowing from block 312 by a second output port 312o2. More particularly, workload analysis block 312 evaluates the path including single data queue 318, path 314, and client 214B, and decides to send on or dump data depending upon the amount of work recently sent toward the client. When the workload of the single data queue, the transmission path 314, and/or the client is determined by workload analysis block 312 to be excessive, such that the queue, the transmission path, or the client 214B would be unable to carry or process all the data, workload analysis block 312 limits the data flowing toward the client 214B. That data which workload analysis block 312 deems acceptable (as not overloading the downstream paths) is routed by way of its first output port 312o1 to input port 318i of single first-in, first-out (FIFO) data queue 318. The term "single" means that for the data path extending between the track server 216Q and its associated client processor 214B, all of the data flowing to the client passes through the FIFO queue. The data arriving at the output or "top" of the FIFO queue 318 is transmitted from data queue output port 318o, by way of track server 216Q output port 216Qo1 and transmission path 314 to client 214B. That data which workload analysis block 312 deems to be in excess of the data that can be accommodated by downstream paths including client 214B is not routed to queue 318, but is instead routed to a second output port 312o2 of block 312, and thence by way of an auxiliary output port 216Qo2 to a "discarded data sink" illustrated as a block 316. This discarding can be accomplished merely by clearing data locations.

The combination of workload analysis block 312 with the queue 318 is theoretically capable of limiting the data flow to the client so as to prevent overloading the client. Under unusual circumstances, however, the single queue 318 might overflow, with the consequent result of loss of data portions from the flow to the client. A dump control illustrated as a block 320 examines the state of the queue, and responds to increases of data in the queue beyond a desired amount by deleting the oldest data from the "top" of the queue. This is represented in FIG. 3 by the output path extending from third output port 216Qo3 of track server 216Q to data sink 316.

Overflow of queue 318, if any, is handled in the following manner. The size or capacity of queue 318 is selected to allow it to hold a number of track updates equal to n, of which m track updates constitute a safety margin. The safety margin of m track updates is selected a priori by methods known to those skilled in the art. This margin provides a temporary space that track updates can occupy while the track server is handling the overflow condition. When the number of track updates in the queue is equal to or greater than n−m track updates, an overflow is deemed to have occurred. When this occurs, the track server removes the oldest track updates in the queue by deleting them.

Figure 4:
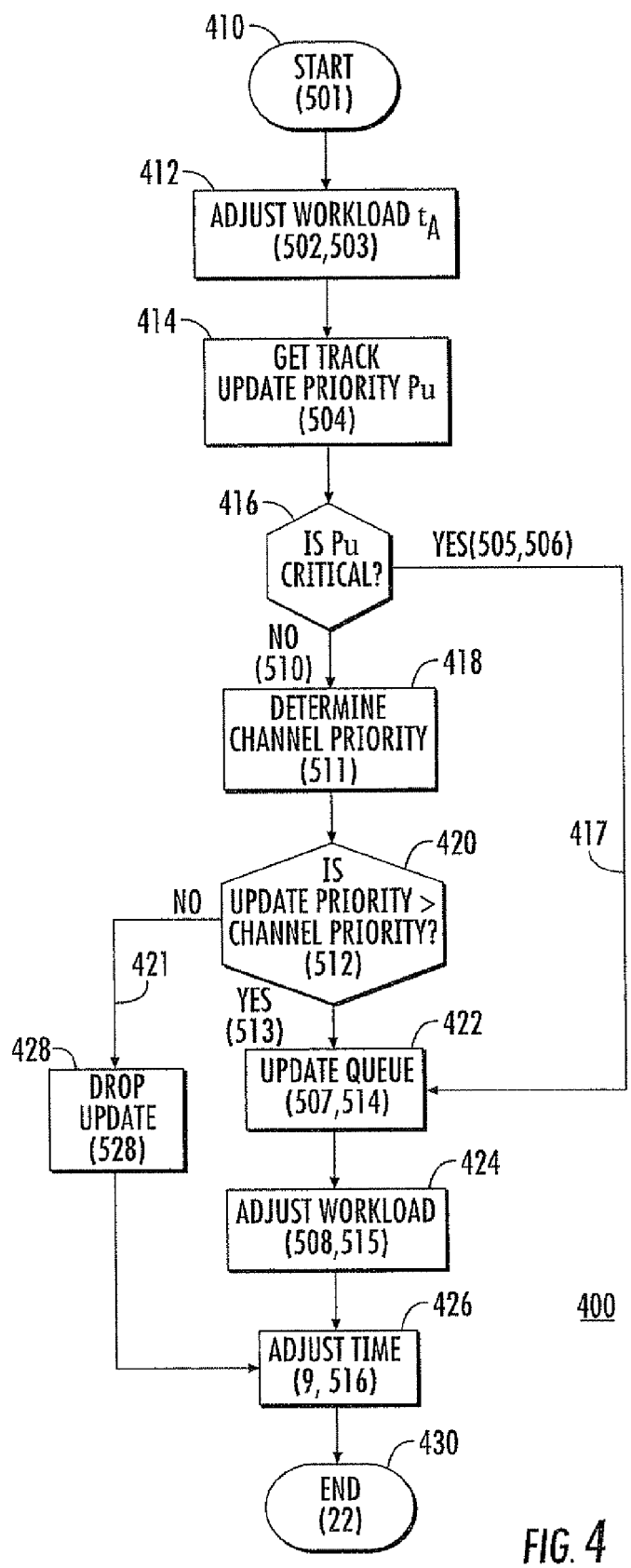
FIG. 4 is a simplified logic or control flow of the track server of FIG. 3.

FIG. 4 is a simplified logic or control flow 400 chart or diagram illustrating the logic performed in the workload analysis block 312 of FIG. 3. In FIG. 4, the logic begins at a START block 410. START block 410 of FIG. 4 is invoked each time a new track update arrives at priority analysis block 310. The function of START block 410 appears as line (501) of the pseudocode algorithm 500 of FIG. 5A. In the algorithm 500, time $t_A$ is used as an indicator of (or proxy for) total client processor workload. Each update sent by track server 216 to client 214 requires the client to perform a unit of work to process the update. On average, the client will use an amount of time of to process the track update. The workload indicator $t_A$ is increased by Δt whenever the track server sends a track update to the client. The workload indicator $t_A$ is reduced each time a new track update is received by the track server, by the amount of time that has elapsed since the previous track update was received. The logic 400 of FIG. 4 flows from START block 410 to a block 412, which represents determination of the time which has elapsed since the last time an update was received by track server 216q and more particularly by priority analysis block 310; the passage of time represents reduction in the pending workload of the client. In the algorithm of FIG. 5A, the function performed by block 412 of FIG. 4 corresponds to lines (502) and (503). As mentioned, the time $t_A$ adjusted in block 412 represents the amount of time the client still needs to process the previously provided data. In step or line 502 of the algorithm of FIG. 5A, $t_C$ represents the current time, and $t_U$ represents the time that the last update was sent by track server 216 to client 214. Time $t_A$ cannot be negative, so the next algorithm step (3) sets negative values to zero, If $t_A < 0$, then $t_A \downarrow 0$.

From block 412 of FIG. 4, the logic 400 flows to a further block 414. Block 414 represents a determination of the priority $P_U$ of the newly arrived update, $P_U \leftarrow$ priority of update, corresponding to step (504) of the algorithm 500 of FIG. 5A. This step is performed differently, depending on the needs of the client, in this case client 214B. Track servers serving clients other than 214B will, in general, perform differently. Three different types of priority value may be assigned: (1) CRITICAL (or the equivalent), (2) continuous (represented by floating point numerical values), and (3) discrete (represented by integer numerical values). The CRITICAL priority may be thought of as having infinite numerical priority. The CRITICAL priority value guarantees a slot in the data queue 318 for all track updates assigned the CRITICAL priority. As an example of the use of the CRITICAL priority, a client 214x interested in the assigned combat identity (CID) of a target track may have their track server 216x assign the update a priority of CRITICAL if the update indicates a change in CID from UNKNOWN to HOSTILE. As an example of the use of the continuous priority, a client interested in significant changes in target position may have its track server assign a floating point priority value proportional to the change in the track's position since its last report to the client. As an example of the use of the discrete priority, a client interested in specific types of target tracks may have its track server assign a higher integer priority value to airborne tracks than sub-surface tracks. From block 414, the logic 400 of FIG. 4 flows to a decision block 416, which determines if the priority of the update is CRITICAL or some equivalent designation. If the update is determined to be CRITICAL in decision block 416, the logic 400 leaves the decision block by the YES output, corresponding to steps (505) and (506) of the algorithm 500. From the YES output of decision block 416, the logic 400 flows by way of a logic path 417 to a block 422. Block 422 represents "sending" the currently received track update data to the client (algorithm step 507), or more particularly represents the loading of the currently received data into the "bottom" of the queue 318 of FIG. 3, from which location the data can work its way up to the "top" of the queue and be transmitted to the client. From block 422, the logic 400 flows to a block 424, which represents, following the sending of the data update to the client, adjustment of the calculated workload $t_A$ by the time $\Delta t$ required for the client to process the data update, $t_A = t_A + \Delta t$. This corresponds to step (508) of algorithm 500 of FIG. 5A. Block 426 of FIG. 4 represents algorithm step (509) of FIG. 5A, the adjustment or re-setting of the time $t_L$ at which the last data update was "sent" to the client (as by loading the data into the queue 318). This adjustment or resetting simply substitutes the current time $t_C$ for the time $t_L$ of the last update. From block 426, logic 400 flows to END block 430, which represents END—For step (522) of FIG. 5B.

Returning now to the discussion of decision block 416 of FIG. 4, the result of finding that the priority of the current data update was "critical" is described above, namely that the update is 'immediately' sent to the client. If, on the other hand, the priority of the data update is something other than "critical," the logic 400 leaves decision block 416 by the NO path, corresponding to algorithm step (510) of FIG. 5A. The logic flows to a block 418, which represents the determination or prediction of the "channel priority", step (511) of the algorithm of FIG. 5A. The predicted channel priority $P_C$ may be viewed as the being the quotient of the current workload of the client divided by the nominal client analysis time $\Delta t$. The current workload is the workload indicator, $t_A$ minus the current time, $t_C$, plus the time $t_L$ that the last update was sent to the data queue 318. The nominal client analysis time, $\Delta t$ is the average time the client needs to process a typical track update.

Decision block 420 of FIG. 4 routes the logic to the YES output if the update priority (obtained in block 414) is greater than or equal to ($\geq$) the channel priority (calculated in block 418), corresponding to steps 512 and 513 of the algorithm 500 of FIG. 5B, and routes the logic by the NO output otherwise (steps 512 and 517 of FIG. 5B). From the YES output of decision block 420 of FIG. 4, the logic flows to block 422, which as described above represents the 'sending' of the data to the client (step 514 of algorithm 500), as by loading the data into the input or 'bottom' of the queue 318 of FIG. 3, from which the data will eventually be clocked out and be sent to the client. From block 422, the logic 400 flows to a block 424. Block 424 represents the adjustment of the workload, step 515 of algorithm 500 of FIG. 5B. From block 424, the logic 400 flows to a block 426, which represents updating the time $t_L$ at which the last update was sent to the client, corresponding to algorithm step 516.

Control of the logic 400 of FIG. 4 flows from the NO output of decision block 420 if the update priority does not exceed the channel priority, and by way of a logic path 421 arrives at a block 428. Block 428 represents deletion of the current data update, as indicated by step 518 of algorithm 500 of FIG. 5B. This is accomplished by routing the data from workload analysis block 312 of FIG. 3 by way of output nodes 312O2 and 216Qo2 to data sink 316. Line 519 of algorithm 500 closes the IF statement in line 512 of the algorithm. Line 520 of algorithm 500 closes the IF statement in line 505 of the algorithm, and the ELSE statement in line 510 of the algorithm. By whatever path, the logic 400 of FIG. 4 eventually arrives at block 426. Block 426 represents the updating of the time $t_U$ at which the last data update was received by the track server at block 216 from the track file provider at block 212. The logic 400 and the algorithm 500 end at an END block 430 and an END FOR step 522, respectively.

The pseudocode 600 of FIG. 6 illustrates how the overflow of data queue 318 is handled. As indicated in line 600, the process is used whenever a track update is sent to the data queue. In line 601 of FIG. 6, the running variable or counter x that tracks the number of track updates currently in the queue is incremented. In line 602, x is compared to the difference between n, the maximum number of track updates the queue should hold, and m, the margin value used to prevent the queue from becoming saturated. If x is greater than or equal to the difference n−m, entries are removed from the queue and x is decremented, as indicated in line 603, under the control of line 604, which causes line 603 to continue to be executed until the inequality in line 602 is no longer satisfied. Line 605 of FIG. 6 closes the IF statement in line 602. Line 606 closes the FOR statement in line 600.

A method according to an aspect of the invention is for transmitting target track updates over a network to a client processor. The method comprises the steps of generating target track updates representative of at least the position of a target (40). A priority is associated with (or to) each of the target track updates (212), which associated priority is one of CRITICAL or its equivalent, or at least one other lesser priority. A target track update queue (318) is provided. The target track update queue (318) includes an input port (318i), and also includes an output port (318O) from which output port (318o) target track updates can be sent to the client processor (214B). The priority is determined of the current target track update (414, 504), and, (i) if the priority is determined to be CRITICAL (416), (a) immediately sending the current target track update to the input port (318i) of the queue (318; 422, 505, 506, 507) and (b) incrementing a client processor time workload ($t_A$) by a time increment (at) (424, 508), where the time increment ($\Delta t$) is the estimated time for the client processor (214B) to process the current target track update, (ii) if the priority is less than CRITICAL, (a) determining the channel priority ($P_C$) by summing the client processor time workload ($t_A$) with the time that the last update was sent to the client ($t_L$) minus the current time ($t_C$) to form a sum, and dividing the sum by the time increment (at), (b) comparing the channel priority ($P_C$) with the priority of the current target track update, (c) if the channel priority is greater than the priority of the current target track update, dropping the current target track update, and (d) if the priority of the current target track update is greater than or equal to the channel priority, sending the current target track update to the input port (318i) of the queue (318), adjusting the client processor time workload ($t_A$) by adding the time increment ($\Delta t$), and adjusting the time ($t_U$) at which the last update was received by the track server (216) from the track file provider (212).

A method according to an aspect of the invention is for conveying information over a network (N) to one or more client processors (214), where each of which client processors (214) has a maximum analysis rate, and the maximum analysis rate may vary from client processor (214A, for example) to client processor (214B, for example). The method comprises the step of providing sensed (24, 26) signals (on paths 213) representing at least one target (40). The sensed signals include individual track updates which are generated at an aggregate track update rate that depends at least upon the number of targets (40) and the number of sensors providing the sensed signals. The priority(ies) of individual track updates are set based on predetermined relatively higher and lower priority criteria, to thereby produce relatively higher- and lower-priority track-prioritized individual track updates. For each of the client processors (of set 214), the track-prioritized individual track updates of the aggregate track updates are analyzed in view of the priority (ies) of the track-prioritized individual track updates and the channel-priority established by the time rate of track updates previously conveyed to the client processor (of set 214), for selecting those individual higher-priority track updates destined for the client processor (of set 214) at an average rate no greater than the maximum analysis rate of the client processor (of set 214), and for deleting those individual lower-priority track updates which are not destined for the client processor (of set 214). The selected ones of said individual higher-priority track updates are transmitted to the client processor (of set 214) at an average rate no greater than the maximum analysis rate of the client processor (of set 214). At each client processor (of set 214), the individual track updates are processed to thereby produce processed track updates. In a particular mode of this method, critical updates are always sent to the client, as for example in the case of closing threat aircraft.

In another particular mode of the method, the step of transmitting the individual track updates to the client processor (of set 214) includes the steps of queuing the selected ones of the individual track updates for application to the client processor (of set 214) when the queue (318) is not full, to thereby produce queued individual track updates, and transmitting from the queue (318) to the client processor (of set 214) all of the queued individual track updates. Selected high-priority individual track updates are not queued when the queue (318) is full, thereby effectively discarding those selected high-priority individual track updates which are not queued.

In yet another particular mode of the method, the step of analyzing the prioritized individual track updates includes the steps of adjusting the measure of the work ($t_A$) recently sent to the client (]]) by reducing the time ($t_C$) that has elapsed since the track update was received from the provider, selecting a priority value for the track update, based on predefined criteria, dividing the reduced measure of the work recently sent to the client by the average processing time needed by the client to process a typical track update, to thereby produce a quotient representing the data channel-priority, predicting current client availability by comparing the calculated data channel priority to the update priority, and if the update priority is greater than or equal to the data channel priority, sending the update to the client.

A system or apparatus according to an aspect of the invention comprises a plurality of ships (14), and a data network (N) extending therebetween. At least some of the ships include sensors (24, 26) for generating target track information including target track updates representing at least the location of a target. The system also includes one or more client processors (214) located aboard at least some of the ships (14). The client processors (214) have throughput or processing rates which may differ one from the next, as may be required by their functions. A track file provider (212) is located on each of the ships. The track file provider aggregates the track updates generated aboard ownship (if any) with those received over the network (N). The track file provider also makes the aggregated track updates available on a separate path for each of the client processors. A data queue (318) is associated with each of the separate paths. Each data queue (318) includes a track update output port (318o) coupled (314) to a corresponding one of the client processors (214), and each data queue (318) also includes a track update input port (318i) for accepting track updates at the track update input port (318i) and for, so long as the data queue (318) does not reach a full condition, eventually transmitting all queued track updates to the associated client processor (214B in the example). The data queue (318) discards the oldest data or track update in the queue (under control of 320) if the data queue (318) reaches a full condition. A workload analysis device (312) is coupled in each of the separate paths between the track file provider (212) and the input port (318i) of a corresponding data queue (318), for determining the priority of the current target track update. The workload analysis device associates a priority to each of the target track updates. The associated priority may be one of CRITICAL (or its equivalent) or at least one other lesser priority. Thus, each track update is prioritized as CRITICAL or a lesser priority. For (i) if the priority is determined by the workload analysis device (312) to be CRITICAL, (a) immediately sending the current target track update to the input port of the queue (318i) and (b) incrementing a client processor time workload by a time increment, where the time increment is the estimated time for the associated client processor to process the current target track update, (ii) if the priority is less than CRITICAL, (a) determining the channel priority by summing the client processor time workload with the time that the last update was sent to the client minus the current time to form a sum, and dividing the sum by the time increment, (b) comparing the channel priority with the priority of the current target track update, (c) if the channel priority is greater than the priority of the current target track update, dropping the current target track update, and (d) if the priority of the current target track update is greater than or equal to the channel priority, sending the current target track update to the input port of the queue, adjusting the client processor time workload by adding the time increment, and adjusting the time at which the last update was received by the track server from the track file provider.

What is claimed is:

1. A method for transmitting target track updates over a network to a client processor, said method comprising the steps of:
   generating target track updates representative of at least a position of a target;
   associating a priority to each of said target track updates, which associated priority is one of CRITICAL or at least one other lesser priority;
   providing a target track update queue for sending said target track updates to said client processor;
   determining the priority of a current target track update, and,
   (i) if said priority is determined to be CRITICAL,
      (a) sending said current target track update to said target track update queue, and
      (b) incrementing a client processor time workload by a time increment,
   (ii) if said priority is less than CRITICAL,
      (a) determining a channel priority,
      (b) comparing said channel priority with said priority of the current target track update,
      (c) if said channel priority is greater than said priority of said current target track update, dropping said current target track update, and
      (d) if said priority of the current target track update is greater than or equal to said channel priority, sending said current target track update to said target track update queue, adjusting said client processor time workload by adding said time increment, and adjusting a time at which the last target track update was received.

2. A method according to claim 1, wherein said time increment is an estimated time for said client processor to process said current target track update.

3. A method according to claim 1, wherein said step of determining the channel priority includes the step of summing the client processor time workload with a time that a last update was sent to the client minus a current time to form a sum, and dividing said sum by said time increment.

4. A method for conveying information over a network to one or more client processors, each of which client processors having a maximum analysis rate, said method comprising:
providing sensed signals representing at least one target, said sensed signals including individual track updates generated at an aggregate track update rate that depends at least upon the number of targets and the number of sensors providing the sensed signals;
setting a priority of individual track updates based on predetermined relatively higher and lower priority criteria, to produce relatively higher-priority and lower-priority track-prioritized individual track updates;
for each of said client processors, analyzing said track-prioritized individual track updates of aggregate track updates in view of the priority of said track-prioritized individual track updates and a channel-priority established by time rate of track updates previously conveyed to said client processor, for selecting those individual higher-priority track updates destined for the client processor at an average rate no greater than a maximum analysis rate of the client processor, and for deleting those individual lower-priority track updates which are not destined for the client processor;
transmitting to said client processor said selected ones of said individual track updates at an average rate no greater than the maximum analysis rate of the client processor; and
at each said client processor, processing said individual track updates to produce processed track updates.

5. A method according to claim 4, wherein said step of transmitting to said client processor said individual track updates includes the steps of:
queuing said selected ones of said individual track updates for application to said client processor when the queue is not full, to produce queued individual track updates; and
transmitting from said queue to said client processor said queued individual track updates; and
not queuing said selected individual track updates when the queue is full, and discarding those selected individual track updates which are not queued.

6. A method according to claim 4, wherein said step of analyzing said prioritized individual track updates includes the steps of:
adjusting a measure of work sent to the client processor by reducing the time that has elapsed since a track update was received;
selecting a priority value for the track update, based on predefined criteria;
dividing a reduced measure of the work sent to the client processor by an average processing time for the client processor to process a typical track update, to produce a quotient representing said channel-priority;
predicting current client availability by comparing the quotient representing said channel priority to the priority of the individual track update; and
if the individual track update priority is greater than or equal to the quotient representing said data channel priority, sending the individual track update to the client processor.

7. A method according to claim 6, wherein individual track updates identified as having a critical priority are always sent to the client processor.

8. A system comprising:
a plurality of ships and a data network extending therebetween, at least some of said ships including sensors for generating target track information including target track updates representing at least the location of a target;
one or more client processors located aboard at least some of said ships;
a track file provider located on each of said ships, which track file provider aggregates the target track updates generated aboard ownship with those received over said data network, and which makes the aggregated target track updates available on a separate path for each of said client processors;
a data queue associated with each of said separate paths, each said data queue coupled to a corresponding one of said client processors for accepting target track updates and for, so long as said data queue does not reach a full condition, transmitting queued target track updates to the associated client processor, and for discarding oldest data in the data queue if said data queue reaches a full condition;
a workload analysis device coupled in each said separate path between said track file provider and said corresponding data queue, for determining a priority of a current target track update, which associates a priority to each of said target track updates, which associated priority is one of CRITICAL or at least one other lesser priority, and,
 (i) if said priority is determined to be CRITICAL,
  (a) sending the current target track update to an input port of said data queue and
  (b) incrementing a client processor time workload by a time increment, where said time increment is an estimated time for said associated client processor to process said current target track update,
 (ii) if said priority is less than CRITICAL,
  (a) determining a channel priority,
  (b) comparing said channel priority with said priority of the current target track update,
  (c) if said channel priority is greater than said priority of said current target track update, dropping said current target track update, and
  (d) if said priority of the current target track update is greater than or equal to said channel priority, sending said current target track update to said data queue, adjusting said client processor time workload by adding said time increment, and adjusting a time at which the last target track update was received.

9. A system according to claim 8, wherein said one or more client processors comprise first and second client processors, and wherein throughput or processing rates of said first client processor are different from throughput or processing rates of said second client processor.

10. A system according to claim 8, wherein said step of determining the channel priority includes the step of summing the client processor time workload with a time that a last update was sent to the client minus a current time to form a sum, and dividing said sum by said time increment.

11. A method for transmitting target track updates over a network to a client processor, said method comprising the steps of:
  generating target track updates representative of at least a position of a target;
  associating a priority to each of said target track updates, which associated priority is one of CRITICAL or at least one other lesser priority;
  providing a target track update queue including an input port and an output port from which output port said target track updates can be sent to said client processor;
  determining the priority of a current target track update, and,
    (i) if said priority is determined to be CRITICAL,
      (a) sending said current target track update to said input port of said target track update queue, and
      (b) incrementing a client processor time workload by a time increment, where said time increment is an estimated time for said client processor to process said current target track update,
    (ii) if said priority is less than CRITICAL,
      (a) determining a channel priority by summing a client processor time workload with the time that the last update was sent to the client minus the current time to form a sum, and dividing said sum by said time increment,
      (b) comparing said channel priority with said priority of the current target track update,
      (c) if said channel priority is greater than said priority of said current target track update, dropping said current target track update, and
      (d) if said priority of the current target track update is greater than or equal to said channel priority, sending said current target track update to said input port of said target track update queue, adjusting said client processor time workload by adding said time increment, and adjusting a time at which the last target track update was received.

12. A method for conveying information over a network to one or more client processors, each of which client processors has a maximum analysis rate, said method comprising:
  providing sensed signals representing at least one target, said sensed signals including individual track updates generated at an aggregate track update rate;
  setting a priority of individual track updates based on predetermined relatively higher and lower priority criteria;
  for each of said client processors, analyzing said track prioritized individual track updates for selecting those relatively higher-priority track updates to be sent to the client processor at an average rate no greater than a maximum analysis rate of the client processor, and for deleting those relatively lower-priority track updates; and
  transmitting to said client processor said selected higher-priority track updates at an average rate no greater than the maximum analysis rate of the client processor.

13. A method according to claim 12, wherein said step of transmitting to said client processor said higher-priority track updates includes the steps of:
  queuing said selected ones of said individual track updates for application to said client processor when the queue is not full, to produce queued individual track updates; and transmitting from said queue to said client processor said queued individual track updates; and
  not queuing said selected individual track updates when the queue is full, and discarding those selected individual track updates which are not queued.

14. A method according to claim 12, wherein said step of analyzing said prioritized individual track updates includes the steps of:
  adjusting a measure of work sent to the client processor by reducing the time that has elapsed since a track update was received;
  selecting a priority value for the track update, based on predefined criteria;
  dividing a reduced measure of the work sent to the client processor by an average processing time for the client to process a typical track update, to produce a quotient representing said channel-priority;
  predicting current client availability by comparing the quotient representing said channel priority to the priority of the individual track update; and
  if the individual track update priority is greater than or equal to the quotient representing said channel priority, sending the individual track update to the client processor.

15. A method according to claim 14, wherein individual track updates identified as having a critical priority are always sent to the client processor.

16. A system comprising:
  a plurality of ships and a data network extending therebetween, at least some of said ships including sensors for generating target track information including target track updates representing at least the location of a target;
  one or more client processors located aboard at least some of said ships, at least first and second client processors having throughput or processing rates which are different from each other;
  a track file provider located on each of said ships, which track file provider aggregates the target track updates generated aboard ownship with those received over said data network, and which makes the aggregated target track updates available on a separate path for each of said client processors;
  a data queue associated with each of said separate paths, each said data queue including a target track update output port coupled to a corresponding one of said client processors and also including a target track update input port for accepting target track updates at said target track update input port and for, so long as said data queue does not reach a full condition, transmitting queued target track updates to the associated client processor, and for discarding oldest data in the queue if said data queue reaches a full condition; and
  a workload analyzer coupled in each said separate path between said track file provider and said input port of a corresponding data queue, for determining a priority of a current target track update, which associates a priority to each of said target track updates, which associated priority is one of CRITICAL or at least one other lesser priority, and,
    (i) if said priority is determined to be CRITICAL,
      (a) sending the current target track update to said input port, and
      (b) incrementing a client processor time workload by a time increment, where said time increment is an estimated time for said associated client processor to process said current target track update,
    (ii) if said priority is less than CRITICAL,
      (a) determining a channel priority by summing a client processor time workload with a time that a last update was sent to the client minus the current time to form a sum, and dividing said sum by said time increment, (b) comparing said channel priority with said priority of the current target track update, (c) if said channel priority is greater than said priority of said current target track update, dropping said current target track update, and (d) if said priority of the current target track update is greater than or equal to said channel priority, sending said current target track update to said input port of said queue, adjusting said client processor time workload by adding said time increment, and adjusting a time at which the last target track update was received.

17. A system according to claim 16, wherein said sensors are selected from the list consisting of radar, sonar and infrared sensors.

18. A system according to claim 16, wherein said at least one other lesser priority comprises a CONTINUOUS priority, wherein said CONTINUOUS priority is assigned to airborne target tracks.

19. A system according to claim 18, wherein said at least one other lesser priority further comprises a DISCRETE priority, wherein said DISCRETE priority is assigned to subsurface target tracks.

20. A system according to claim 18, wherein said CONTINUOUS priority is relatively higher than said DISCRETE priority.

\* \* \* \* \*

UNITED STATES PATENT AND TRADEMARK OFFICE
CERTIFICATE OF CORRECTION

| | |
|---|---|
| PATENT NO. | : 8,098,183 B1 |
| APPLICATION NO. | : 12/403733 |
| DATED | : January 17, 2012 |
| INVENTOR(S) | : Richard N. Pedersen |

It is certified that error appears in the above-identified patent and that said Letters Patent is hereby corrected as shown below:

Col. 15, claim 12, line 47, the word "track" should be deleted.

Signed and Sealed this
Thirteenth Day of March, 2012

David J. Kappos
*Director of the United States Patent and Trademark Office*